Nov. 11, 1941. G. M. DARBY ET AL Re. 21,940

FLOCCULATION

Original Filed Oct. 21, 1938 2 Sheets-Sheet 1

Inventors:
GEORGE M. DARBY
WILLIAM C. WEBER
ANTHONY J. FISCHER
By Arthur Middleton
Attorney Nov. 11, 1941. G. M. DARBY ET AL Re. 21,940

FLOCCULATION

Original Filed Oct. 21, 1938 2 Sheets-Sheet 2

Inventors:
GEORGE M. DARBY
WILLIAM C. WEBER
ANTHONY J. FISCHER
By Arthur Middleton
Attorney Reissued Nov. 11, 1941

Re. 21,940

UNITED STATES PATENT OFFICE 21,940

FLOCCULATION

George M. Darby and William C. Weber, Westport, Conn., and Anthony J. Fischer, Flushing, N. Y., assignors to The Dorr Company, Inc., New York, N. Y., a corporation of Delaware Original No. 2,143,750, dated January 10, 1939, Serial No. 236,282, October 21, 1938. Application for reissue September 30, 1939, Serial No. 297,362

7 Claims. (Cl. 210—12)

Figure 1:
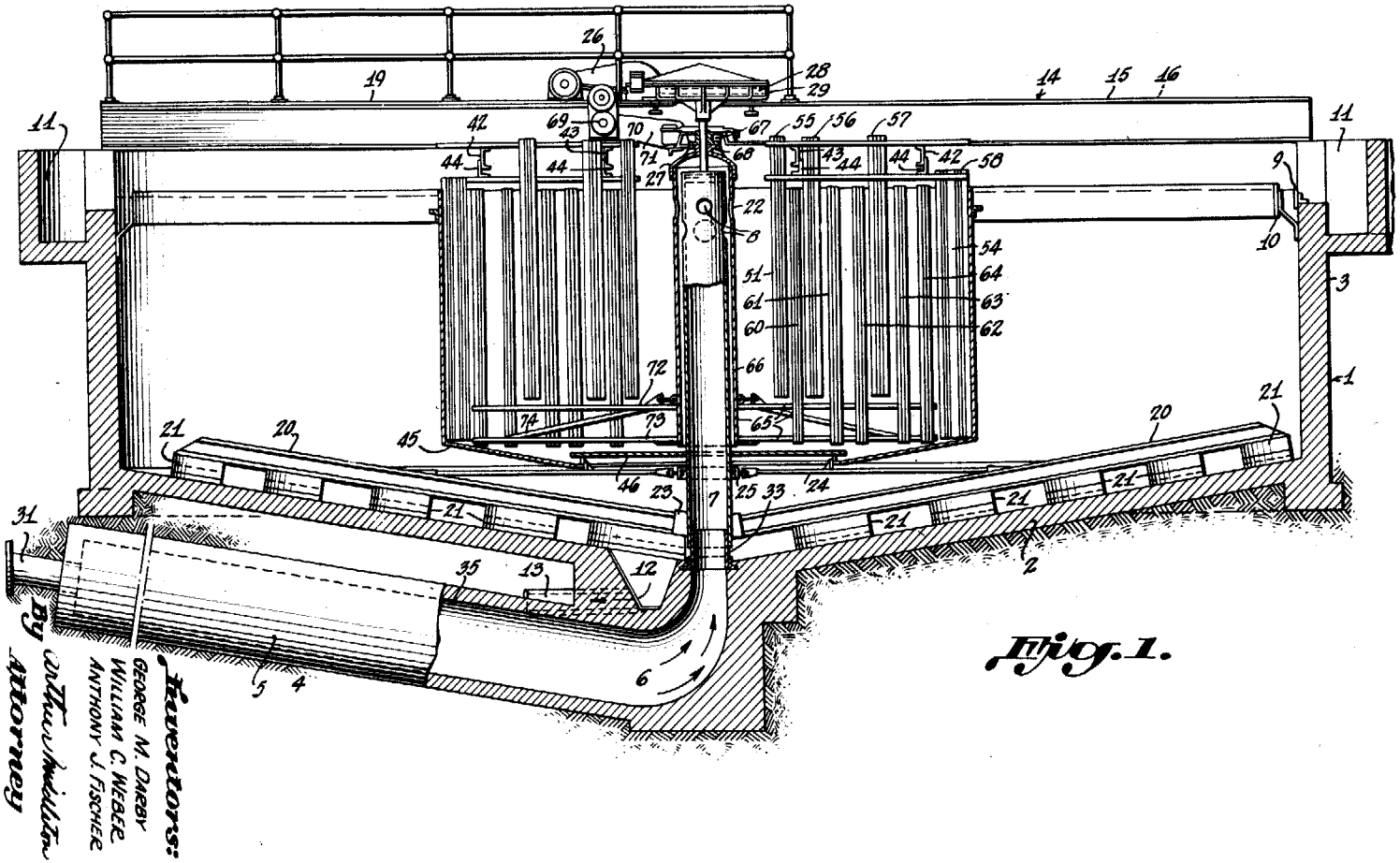

This invention relates to the separation of solids from liquids by sedimentation devices or tanks variously called thickeners, clarifiers, settlers and the like, their major characteristic being that liquid is fed thereto for treatment, and therefrom there flows as effluent by one path decanted clarified liquid and by another path there are withdrawable solids that have settled in the form of sediment from the quiescent liquid in the clarifier. This sediment is called variously sludge, pulp, or slime depending upon the industry in which the device is used. When a device of this type is used to clarify liquid of organic solids, the sediment is referred to as sludge and the device as a clarifier. When used to recover inorganic solids from liquid, such as in metallurgy, the sediment is referred to as pulp or slime and since the sediment is said to be thickened, the device for so doing is called a thickener.

Such devices, as used today, are usually provided with travelling means for impelling sediment to discharge from the tank. These means include travelling or rotating arms equipped with sediment impellers usually called rakes, scrapers or blades.

When such settler tanks are used to treat liquids having readily settleable inorganic solids, little difficulty is encountered but when settlers are used to clarify liquids of organic solids, trouble is experienced. Indeed, the usual laws of sedimentation appear to be thrown out of kilter when treating flocculatable solids. It has only lately been found that when treating flocculatable solids, flocculation tends to take place and this hinders sedimentation because conditions conducive to these two phenomena are opposite and contradictory. Flocculation requires an agitative condition while sedimentation requires quiescence.

On the other hand it was well known that well-flocculated solids are readily settleable—so engineers began to try to flocculate the solids before exposing them to sedimentation. This was done in separate independent zones. But next it was found that the flocs so formed were fragile to such an extent that during transfer of the floc-laden liquid from the flocculation zone to the sedimentation zone, the flocs were disintegrated and broken down. This is serious because when once disintegrated, it is practically impossible to re-flocculate the previously flocculated material.

This difficulty can be overcome by having the flocculation zone and the sedimentation zone in one basin or tank whereby the floc-laden liquid could be transferred directly to the settling zone whereby there was no harmful influence exerted on the flocs. This juxtaposed arrangement has proved feasible and efficient in certain types of equipment such as where the flocculation zone could be superposed on the settling zone, as exemplified in the patent to Downes, No. 1,752,789, and in rectangular tanks where the flocculation zone could be located in the head end of the settling tank, as exemplified in the patents to Smith No. 1,893,451 and to Darby No. 2,087,851. But new problems were presented when such a direct relationship is to be arranged between a flocculation zone and a surrounding sedimentation zone having horizontally-concentric disposition with respect to each other as for example in a round clarifier (a type having admitted high clarifying efficiency). Various attempts to solve these problems were made, but that offered by this invention seems to be the most feasible and satisfactory.

More particularly, this invention may be said to emphasize the horizontally concentric location of a flocculation zone within a round sedimentation tank, or one that is substantially round, and equipped with sediment impelling rakes that rotate about a vertical axis, and wherein the liquid to be treated is fed first to the flocculation zone. The flocculation zone is characterized in that it yields integrated flocs conditioned for settleability resulting from the use in that zone of current producing mechanism having an assembly of angularly disposed blades moving in repetitive paths extending from a center of motion. In other words, each of the blades shown is disposed at an angle—the sides of which angle are horizontal—to the horizontal path of travel of the blade, that is, all of the blades extend vertically and are positioned so that the horizontal sections thereof horizontally-slant, or have horizontal angular disposition with respect to the radial line extending horizontally from the center of motion and passing through the respective sections. The flocculation zone can be satisfactorily fed from beneath the liquid level in the sedimentation tank such as by means of an inverted siphon or U-shaped feed pipe. The outlet arrangement from the flocculation zone is important, for the flocs must not only be removed therefrom without damage thereto but the bottom must have settled or sedimented flocs swept therefrom into the sedimentation zone. The reason is that the flocs contain organic material that tends to become septic. Septic conditions must be avoided by getting the flocs out of the flocculation zone with promptness and assurance. The outlet is disposed in the bottom section of the flocculation zone and provides a path along which the settled integrated and conditioned flocs drift in a general downward direction. As the preferred form, the flocculation zone is disposed at a height above a portion of the sludge raking mechanism, the finished flocs from the flocculation zone should not be emitted too rapidly into the sedimentation zone. To prevent this it is proposed herein to provide a substantially annular outlet from the flocculation zone that is baffled so that the finished flocs in passing from the flocculation zone to the sedimentation zone, to some extent under the action of gravity, are caused to move with a slow change of direction within the flocculation zone and then downwardly and inwardly into the sedimentation zone. More particularly the invention proposes a circular baffle (that may rotate) interposed in the main bottom outlet of the flocculation zone to dampen any momentum attained by the finished flocs so that they pass from the flocculation zone centripetally to the sedimentation zone and are directed downwardly and preferably inwardly but with a minimum of velocity. Passage of the finished flocs to the sedimentation zone in a downward direction is important and also that the transfer takes place near the bottom of the sedimentation zone by means of sweeping current impulses. More particularly, the invention resides in the structures herein proposed for use, their cooperative relationships, and the steps of treatment carried out by them.

One manner of carrying out this invention is to supply liquid from which suspended solids are to be removed or recovered, to the herein proposed flocculating clarifier combination through a pipe or conduit that passes from outside of the combination apparatus beneath the liquid level in the tank thereof and indeed preferably beneath the floor of the tank, to a centrally located flocculation zone that is encircled by but functionally separated from a surrounding sedimentation zone equipped with travelling rakes for impelling sediment to discharge or withdraw from the tank. The tank is provided with an outflow for effluent of clarified liquid.

The flocculation zone is provided with bladed agitative means adapted to cause a multitude of collisions between suspended solids and other particles of turbidity in the liquid under such conditions of agitation as to be conducive to the agglomeration and coagmentation or amassment of the suspended solids into flocs of settleable size and density. That is, floc nuclei are caused by being deflected repetitively laterally from the blades to meander around in the liquid of the flocculation zone for the purpose of colliding with other flocs and solids to produce large colonies of flocs and solids. Further motion of these tend to roll them up or otherwise make them dense. As they increase in size and density their settleability tends to increase, and indeed they start downwardly in settlement, but the agitative means used is such that settling flocs are disturbed in their settling and again caused to meander through the liquid.

Flocs ultimately grow until the agitative means no longer sweeps them back into circulation, whereupon they descend to a point where they and their carrying liquid vehicle flow or drift from the flocculation zone directly to the encircling sedimentation zone under conditions whereby they are not disintegrated and whereby the agitation existing in the flocculation zone does not reach into the sedimentation zone to harmfully disturb the necessary quiescence therein. To that end a dividing bottom wall or partition is provided between the flocculation and sedimentation zones that is made permeable or apertured for the transfer of floc-laden liquid to the sedimentation zone but not permeable to the agitative effects existing in the flocculation zone. It is desired to have the finished floc transfer take place from the bottom section of the flocculation zone due to co-action between the agitating blades and the construction of bottom so that the bottom of the flocculation zone is continually swept substantially clean of settled or sedimented flocs. The attainment of this end is helped by coning or inclining downwardly the bottom of the flocculation zone. The feed of liquid to be flocculated and subsequently clarified is fed to the annular flocculation zone through an upstanding conduit that penetrates the sedimentation zone through its bottom and rises upwardly through the bore of the flocculation zone. It is provided with outlet means in the upper region of the flocculation zone and equipped preferably with some arrangement to cause a distribution of the feed liquid released into the flocculation zone. The upstanding conduit means is connected with a further conduit means extending preferably beneath the bottom of the sedimentation tank and connected to a source of supply liquid.

The agitative devices depended upon for flocculation comprise to advantage a combination of angularly disposed moving and stationary bladed or paddle members. The vertical disposition of these members has been found satisfactory. These members are located within the flocculation zone and the movable members are impelled from the same type of motivating device as that which causes the sludge rakes to rotate.

In general the liquid to be flocculated has to be held in the flocculation zone for such a detention period that the flocculation zone is almost as large as the sedimentation zone. This is particularly apparent when one observes a flocculation zone and a sedimentation zone arranged in sequence in a substantially rectangular tank. This detention time or detention capacity of the flocculation zone seems necessary to avoid short circuiting and therefore to attain effective flocculation. Therefore, it was not to be expected that a flocculation zone could be arranged surrounded by a sedimentation zone but upon experimenting and testing it became demonstrated that the concentric arrangement of this invention is not only desirable but highly practicable.

In flocculation it has been thought lately that it was dangerous to change direction of flow of flocculated liquid for fear of damaging the fragile flocs which when once disintegrated are all but impossible to re-flocculate. At first glance the embodiment chosen to illustrate this invention will give the impression that there is much changing of direction of the incoming liquid, which flows substantialy horizontally, then vertically, then horizontally into the inner flocculation-zone—passing on its way through ported feed openings in an inner tubular member or rake-arm carrying shell, and also through apertures in an outer tubular cage, drum or frame providing a motivated vertically-extending support of a horizontally-turnable blade carrying means. In the flocculation zone the liquid is agitated and directed by the conjoint functioning of stationary baffle members and movable paddles whereby agitated liquid is continually moved toward the incoming liquid. Liquid from the flocculation zone continually passes through a sinuous path formed by a tapered apertured bottom of the flocculation zone which in the construction shown is obstructed by a horizontal baffle. Nevertheless, this change of direction seems to take place with such gentleness and low velocity that the flocs are not detrimentally damaged thereby.

The mounting and driving of this complex or compound mechanism presents a problem not only because it is desired that they all be supported from above the liquid level in the clarifier, but because the different moving parts have to travel different relative speeds. At the same time it is preferable to use only one motor if such be possible. The problem was solved by providing an overhead support for the motor and its associated driven parts. From the same support depend the defining walls of the flocculation zone. The rotating paddles in the flocculation zone are driven through a drive head and speed reducer from the motor all suitably supported. The motor also drives a clarifier drive head mechanism from which the mechanism depends, and according to the form shown there is a cylinder or drum forming a vertical and outlet section of an influent conduit. This drum rotates and carries with it the substantially radial arms that are disposed beneath the flocculation zone. The arms carry the sludge raking blades that impel sediment or sludge discharge. Encircling the influent drum that also rotates the sludge rake arms, is the outer drum which in this case is rotated not from the clarifier drive head but from the flocculator drive head and associated with it are the movable paddles in the flocculation zone. Thus the movable paddles in the flocculation zone can be driven at a speed different, or perhaps we should say, greater than the much lower speeded sludge rake arms. Such a device is operable continuously and is well adapted to treat liquid bearing organic solids that go septic on standing, (such as sewage) because sediment is continually mechanically removed from the floor of the sedimentation zone—and no substantial quantity thereof accumulates on the floor of the flocculation zone because the agitative devices are designed to sweep them either back into suspension, or out from the flocculation zone into the sedimentation zone. Details of construction described hereinafter are important but need not be referred to in this general statement about the practice of the invention.

In the accompanying drawings constituting a part of this specification, there is illustrated one form of apparatus that embodies or realizes the invention and the underlying features thereof. It is to be understood that the invention is not limited to the specific form and construction shown as it may be embodied in various forms and modifications without departing from the spirit or scope of the invention as defined in and by the claims of this specification.

The illustrated apparatus of this invention may be described as embodying a main sedimentation basin or zone provided by a settling tank, the bottom of which is mechanically raked by an assemblage of raking mechanism that is turnable in horizontal paths about a vertically-extending axis. The interior of the tank is divided by an intermediate partial partitioning means into an inner or centrally-disposed flocculation zone that is in constant hydraulic communication through an annular orifice providing portion with the outer or surrounding sedimentation zone wherein quiescent conditions are maintained favorable to settling of settleable solids from the liquid in said zone. This annular orifice providing portion, through which constant hydraulic communication is maintained between the flocculation zone and the sedimentation zone, is shown in the drawings as being constructed and disposed so that incident to a passing of incoming liquid into the flocculation zone there is a consequent passing of flocculated liquid from the lower portion thereof through the orifice into the sedimentation zone in a direction downwardly and preferably radially inwardly into an underlying portion of the body of liquid undergoing sedimentation within the sedimentation zone.

Figure 2:
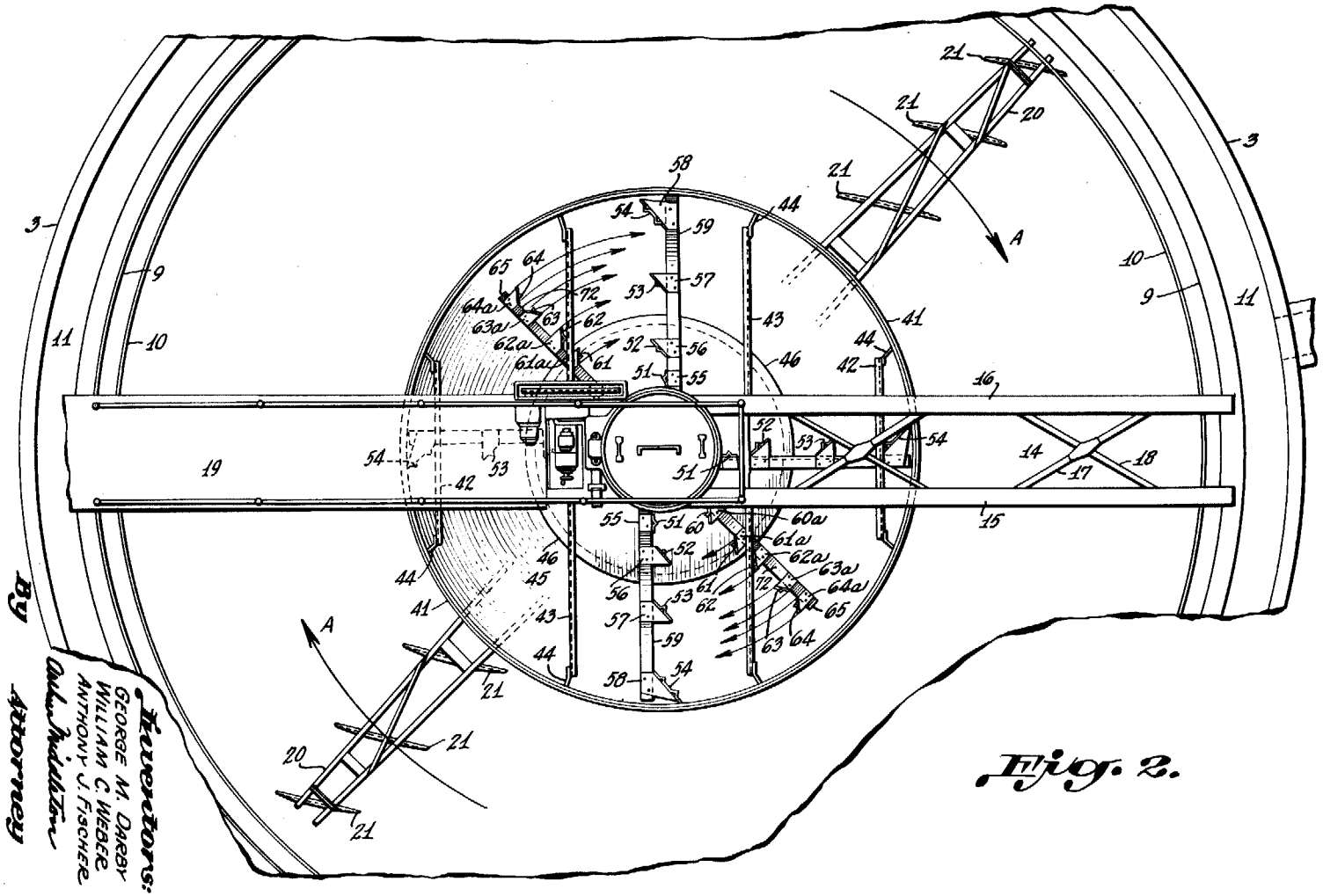

In the accompanying drawings: Fig. 1 is a vertical sectional view of a combined flocculation and sedimentation unit or apparatus designed for realizing the invention, and Fig. 2 is a plan view of the unit or apparatus shown in Fig. 1.

The sedimentation basin or zone is provided by a settling tank 1 shown as having a downwardly and inwardly sloping main bottom 2 and an upwardly-extending marginal or boundary wall 3. This tank has associated therewith an influent supply or liquid feeding means 4 which comprises an inwardly and relatively horizontally-extending tubular section 5 leading to tubular sections 6 and 7, the latter of which is apertured at 8 whereby the apertured portions serve as feed delivery openings leading from the feed supply means and delivering liquid passing therethrough into the inner zone or flocculation section of the tank. The apertured portion of tubular section 7 constitutes a ported section providing influent discharge ports at the terminal of the influent supply means of which the tubular section constitutes a part. In the construction shown the tubular section 6 is in fact in the form of an elbow having a passageway therethrough which progressively decreases in cross-sectional area and the tubular section 7 provides an upflow conduit having the feed discharge apertures 8 leading from the upper portions thereof. The tubular sections 5, 6 and 7 constitute part of what is frequently referred to in this art as an inverted syphon type of liquid feeding means leading to and delivering into a liquid-treating or sedimentation tank.

The tank has an overflow member 9 providing a weir that determines the normal operative level of the liquid within the tank and past which supernatant liquid overflows from the upper portion of the sedimentation zone into a marginal launder 11 from which the effluent overflow passes to any suitable place of use or to other place serving as a receiving space therefor. In order to prevent any floating debris or scum from entering the weir and pass into the launder 11, a circumferential ring or baffle 10 is fixed to the upper end of the wall 3. The upper edge of the baffle extends above the liquid level and is suitably spaced from the wall 3.

The bottom of the tank is constructed so as to provide a sump 12 suitable for receiving sedimented material passed thereto by the sediment-raking mechanism which operates over the tank bottom. This sump 12 constitutes a part of a structural portion or section which may be referred to as a sediment discharge means leading from the lower interior portion of the tank and in this connection it will be observed that a pipe 13 leading from this sump constitutes a part of said means and serves in the hydraulically conveying of sedimented material from the tank to any locality or place to which the sedimented material is to be passed.

In the apparatus shown, there is a beam or truss construction 14 extending across the tank and supported from opposite portions of the marginal wall of the tank. This beam or truss construction embodies a pair of channel or I-beams 15 and 16 connected by cross tie members 17 and 18 constituting cross braces. The beams may be considered as further tied together by floor plates 19 that are disposed so as to provide a walkway from the marginal portion of the tank to operating mechanism located at or above the central portion of the tank.

Reference has heretofore been made to travelling means for impelling sediment to discharge from the tank. This very slowly moving means is provided by an assemblage of raking mechanisms having or providing bladed elements that function over a bottom of the tank, the purpose of which is to engage sedimented material at the bottom of the tank and to impel and convey the sedimented material without roiling it from diverse sections of the tank bottom toward and to the sump or sediment discharge section 12 as the raking elements turn in closed horizontal paths about a vertically-extending axis.

In the construction shown this assemblage of raking mechanism comprsies outwardly-extending rake-carrying arms 20 which embody or carry raking blades 21 providing sludge-engaging members that collectively constitute a sediment-raking element or sediment-raking elements and which function progressively to collect and transfer sedimented solids downwardly along the sloping floor until the solids transferred thereby are ultimately received into the sump or solids-receiving section 12 heretofore referred to.

The rake-carrying arms are in turn supported from a carrying shell or drum member 7 that encompasses and is horizontally turnable about a vertically-extending axis. The arm-carrying shell or carrier drum is embodied in or embodies the horizontally-turnable tubular section 7 that provides the upflow feed conduit heretofore referred to and which, as already pointed out, constitutes a part of the influent feed means.

The rake-carrying arms 20 are arranged as a pair and extend in opposite directions from the arm-carrying shell 7. The inner ends 23 of the arms are connected to and carried from the lower end of this rotatable drum member and they derive further carrying support from the drum through the medium of tension rods 24 which can be adjusted as to length by the screws or bolts 25. In this way the elevation or position of the outer ends of the arms relative to the floor or bottom of the settling tank can be adjusted to a limited extent. The upper end of this drum is supported by and from a shaft 27 which in turn is supported from and through the medium of a turnable gear 28, constituting part of a motivated actuating mechanism 26, and which gear is in turn mounted on a stationary bearing member 29 carried by the beam or truss construction 14 heretofore referred to. A motivated mechanism having a gear suitable for rotatably driving and supporting the shaft 27 just referred to is shown in the Scott Patent No. 2,087,725 of July 20, 1937 and further description of the mechanism and parts by which the shaft 27 and the arm-carrying shell 7 may be turnably supported and operated in the required manner is not necessary in view of the disclosure in said patent.

Reverting now to the influent supply means, it will be noted that it also comprises a pipe end 31 that supplies liquid to be treated to the horizontally-extending influent supply conduit means shown in section in the lower left hand portion of Fig. 1. Feed supplied as influent through pipe having end 31 is delivered through a relatively straight flow unobstructed cylindrical passageway to a location whereat it is delivered directly into the elbow section 6 from whence the influent liquid passes into the upflow leg provided within the rotatable arm-carrying shell or member 7 heretofore referred to. In connection with the construction just referred to it will be noted that a fixed influent sealing member 33 provided on the elbow section 6 extends into and has overlapping relationship with respect to the lower end of the rotatable tubular member or arm-carrying shell 7 by which the upflow leg of the influent supply means is provided. The overlap of this influent seal is sufficient to prevent any substantial leakage of influent between the fixed member of the sealing construction and the lower end of the turnable arm-carrying shell 7.

The settling tank has a partial partitioning means functionally dividing the liquid-holding portion thereof into horizontally-concentric inner flocculation and outer sedimentation zones that are in constant hydraulic communication with each other through a submerged passageway area left by or in the partial partitioning means. This partial partitioning means in the construction shown embodies an intermediate wall or cylindrical baffle section 41 which is supported from the transverse beam or truss construction 14 through the medium of the horizontal transverse carriers provided by channel members 42 and 43 to which the wall 41 is connected as by means of the angle members 44. At the lower end of this cylindrical wall section 41 there is carried an annular floor portion 45. This annular bottom portion is preferably secured to the cylindrical wall 41 in a manner to make a relatively tight marginal joint, as by welding, and this bottom portion provides a central orifice or discharge passageway area through which said turnable arm-carrying shell 7 extends vertically. The partial partitioning means may also be considered as comprising a circular plate or baffle 46. This circular plate constitutes a floor member or section whose outer margin is spaced above and overlies the inner edge of the orifice and the annular bottom portion 45 just referred to. In the construction shown this circular plate 46 is secured to and turns with the turnable arm-carrying shell 7 that carries the raking-arms 20 from a section below the circular plate 46.

The members 45 and 46 constitute the lower portion of the partial partitioning means and are vertically-spaced above the main floor of the tank. Of these members the annular bottom portion 45 may be referred to as a stationary outwardly-disposed bottom section having a central discharge opening and the member 46, which has been described as a circular plate or baffle, may be referred to as a central plate disposed at an elevation higher than that of the central discharge opening of the bottom section 45 whereby an annular or annulate type of passageway is constantly left between the outwardly-disposed bottom section and the central plate. In the construction shown the central plate 46 is supported independently of the outwardly-disposed bottom section 45. The central plate 46 is horizontally-turnable about a vertical axis and relative to said stationary bottom section 45, and has extent to a locality proximate the opening-defining-edge of the bottom section 45 whereby there is realized and provided an endless non-obstructed passageway between the flocculation and sedimentation zones.

The cylindrical wall section 41, the annular bottom portion 45 and the circular floor plate 46 in effect provide the partial partitioning means which divide the interior of the settling tank into concentric inner and outer flocculation and sedimentation zones that are in constant hydraulic communication through an annular outlet left in the bottom portion of the partitioning means.

In connection with the annular floor plate section 45 which is carried by and from the cylindrical wall of the partial partitioning means, it wil be noted that this annular bottom member is coned, that it has a downward and inward slope. It is associated with the circular baffle member 46 in a manner whereby there is provided the annular orifice or outlet passageway within the partial partitioning means. As incoming liquid is fed into the flocculation zone there takes place a passage of flocculated liquid along a downward and radial inwardly-inclined path, to wit., centripetally downward into that portion of the liquid which is immediately below the flocculation zone but which constitutes a part of the body of liquid detained in the quiescent sedimentation zone. It also follows that incident to the feed within the flocculation zone and the displacement of the liquid therefrom into the sedimentation zone, there is a consequent and corresponding passing of supernatant liquid from the upper portion of the sedimentation zone and as overflow past the marginal weir 9 into the effluent launder 11 with which the tank is provided. Fixed baffle or bladed flow-retarding and flow directing members 51, 52, 53 and 54 are respectively carried by and depend from stationary baffle supports 55, 56, 57 and 58 which in turn are carried by channel members 59 that are in turn secured to the beams or truss construction 14. The baffle supports 55, 56, 57 and 58 are shown as being in the form of flat horizontal plates that are suitably secured to the channel members 59 and to an edge portion of each of these horizontal plates there is secured in any suitable manner the upper end of the respective fixed baffle or flow-directing blades 51, 52, 53 or 54, as the case may be, whereby such fixed baffles or blades extend downwardly or depend from the place of support. In the structural arrangement shown these stationary bladed members or baffles extend vertically and are horizontally spaced at diverse radial distances from the vertical axis about which the sediment-raking mechanism turns.

Within the flocculation zone, there are also employed sets of movable vertically-extending liquid agitating blade assemblies or flocculating means that include such members as agitating or flocculating paddles 60, 61, 62, 63 and 64 which extend from paddle-carrying arm structures 65 which in turn are carried by and extend radially from an outer turnable cage, drum or frame 66, that encircles or surrounds the arm-carrying shell 7. The paddle carrying arm structure 65 and the turnable cage, drum or frame supporting the same may be collectively referred to as a horizontally-turnable paddle support from which certain paddles extend vertically. The upper portion of this cage is apertured at 22, or provided with suitable openings, whereby incoming liquid passing the discharge openings 8 of the ported section of the tubular rake arm carrier 7 can pass into the liquid-holding portion of the inner flocculation zone. The upper end of the outer turnable structure or horizontally-turnable paddle support has a ring gear 67 which is turnably supported upon a stationary bearing member 68 that in turn derives support from the transverse beam or truss construction 14. The outer structure turns about a vertically-extending axis that is concentric with the axis about which the rake-carrying arms turn and it is actuated by any suitable motivating mechanism 70 such as one employing a motor 69 operating through the medium of speed reducing and power transmission gearing 71 and preferably regulatable in a manner whereby the velocity of turning movement of the outer turnable structure and thus of the flocculating blades carried thereby, can be adjusted to the proper operative requirements, to wit, at such a rate as will produce agitation conducive to floc formation and floc amassment within the flocculation zone. The frame or structure 65 by which these movable flocculating paddles or blades 60, 61, 62 and 63 are supported from the turnable outer structure is shown as comprising upper and lower radial members 72 and 73 and tension member 74 whereby a suitably braced paddle-carrying arm is formed. The vertically-extending flocculating paddles 60 etc. are mounted by being secured at the lower ends thereof to said rotating paddle supporting arm or frame 65. More specifically the flocculating paddles or blades 60, 61, 62, 63 and 64 may be described as supported from the radial members as 72 of the arm-providing structure 65 through the medium of flat horizontally-extending connecting plates 60ᵃ, 61ᵃ, 62ᵃ, 63ᵃ and 64ᵃ, as the case may be, which are suitably secured to the radial members as 72 and to which there are secured the lower end portions of said flocculating paddles or blades so that they extend upwardly from the said connecting plates by which they are in turn carried. It will be noted that the stationary bearings, by which the sediment-raking assemblage and the flocculating means are carried, are located above the normal level of the liquid, which level is determined by the overflow weir of the effluent withdrawal means.

As to the fixed bladed members 51, 52 53 and 54 they are of variant and gradient sizes with the ones having the smaller size or lesser width nearest the center of the tank and with the ones having the larger or broader faces outwardly disposed proximate the interior of the intermediate or cylindrical wall 41 of the partial partitioning means. The flocculating paddles or bladed movable members 60, 61, 62, 63 and 64 are shown of equal breadth. They have radial disposition along the carrying structure therefor and are positioned so as to pass through the spaces left between the fixed blades 51, 52, 53 and 54.

The agitating paddles or movable blades 60, 61, 62, 63 and 64 move as sets in circular paths in the general direction indicated by the arrow A. This general direction will be referred to as the direction of forward movement not only for the sets of movable paddles of the flocculating mechanism, but also as indicating the forward movement for the sediment-raking mechanism. The angular velocity of the forward movement of the sediment-raking mechanism is less than the annular velocity of the flocculating assemblage.

Of the stationary bladed members 51, 52, 53 and 54 it will be noted that the rear face of each blade 51 on horizontal lines extends substantially radially and that the rear faces of the other blades 52, 53 and 54 on horizontal lines extend inwardly and forwardly or as otherwise expressed, the rear face of each blade has a forward and lateral slant. Each of these stationary blades, by the rear face portions thereof, are relied upon to retard and direct the flow of forwardly moving liquid engaged or influenced thereby and which forward flow or movement of liquid is induced or impelled by the front face portions of the forwardly movable paddles 60, 61, 62, 63 and 64. Each movable paddle 60 has a rearward inward slope or as otherwise expressed, a rearward lateral inclination or slant and passes through the fixed space provided between stationary blades and tends to impel liquid forwardly and inwardly as toward a fixed deflecting and retarding blade 51. Each movable paddle 61 and 62 has a rearwardly and inwardly extending front face portion. These paddles 61 and 62 move as a set forwardly and to and through the space between the fixed deflecting blades 52 and 53. The tendency of the directed flow is forwardly and inwardly because of the forward and inward extent of the fixed blades 52 and 53 and of the rearward and inward extent of the movable paddles 61 and 62. This forward and inward tendency creates a reflected flow in the form of an outward and forward current flow which will lead to and tends toward the removal of material which might otherwise have a tendency to collect as sediment on the circular plate or floor portion 46. The movable paddles 63 and 64 are arranged so that the forward face portions converge rearwardly toward each other and thus as they move forward they tend to deflect the liquid engaged thereby into the space between them. These two paddles move forwardly and through the space between the fixed blades 53 and 54. This results in a different type of flow action and flow movements within the outer portion of the flocculation zone and incident to this forward movement there is a sufficient but gentle disturbance of a character to tend to maintain a relatively clear flow area on the annular floor section 46.

As the majority of the movable paddles to wit, 60, 61, 62 and 64 have forward faces which slope rearwardly and inwardly and as the majority of the stationary blades, to wit, 52, 53 and 54 have rear faces which slope forwardly and inwardly they conjointly function due to their angularity, to cause the liquid agitated thereby to tend to move toward the source of feed or delivery of liquid as it is introduced into the flocculation zone. In other words, this agitation is of a type which brings at least some of the formed or developing flocs into the region of the incoming liquid.

In order to impart stiffness to each of the fixed bladed members 51, 52, 53 and 54 and to each of the movable paddle members 60, 61, 62, 63 and 64 there has been provided at least one vertically-extending rib or protruding section which is indicated by the single protruding portion at the rear face of fixed blades 51, 52 and 53 and by the double protruding portion at the rear face of the fixed blade 54, and by the single protruding portion on the forward face of each of the movable paddle members 60, 61, 62, 63 and 64.

It will be noted in connection with the structure just described, that the movable paddles above referred to, move to impart the desired agitation to the liquid within the flocculation zone and that the paddle-supporting arms incident to the movement aid in imparting flow movements to the liquid within the flocculation zone whereby there is avoided any objectionable retention of solids on the flow defining section of the flocculation zone. In this way there is insured an avoidance of the retention of any objectionable deposition on the floor provided by the partial partitioning members. Also incident to the turning movement of this mechanism there is a production of flow currents which tend to aid in the movement of flocculated material downwardly and inwardly along the annular sloping bottom portion 46 whereby a desired operation of the apparatus will be effectively and efficiently maintained.

By the operating of the flocculating mechanism described, floc nuclei and flocs are first amassed or coagmented or integrated but in this phase they may be difficult to settle, so it becomes important to condition them for settleability. And this seems best accomplished by sweeping into the incoming feed liquid, a multitude of flocs that already has attained settleable characteristics. To that end the blades are tilted or set at an inclined angle to their path of motion whereby settling flocs are deflected angularly or laterally to the region of the released incoming feed. Tilting, sloping or inclining of the stationary blades or baffles in the opposite direction also aids in this conjoint deflection of the liquid.

From what has preceded, and also from the disclosures in the drawings hereof, it will be noted that the forward or liquid-impelling faces of the movable agitating paddles or blades 60, 61, 62, 63 and 64 are inclined or slanted laterally with reference to their forward horizontal cyclic paths that encircle the vertical axis about which they move, and that the liquid deflecting baffles or blades 54, 53 and 52 are disposed so that their rear or liquid deflecting faces are inclined or slanted laterally with reference to the forward paths of the agitating blades. The foremost vertically extending edge of the agitating paddles and the rearmost extending vertical edge of the deflecting baffles in effect constitute cutting edges whereby sharp or hammer-like disturbances of liquid engaged thereby or engaging the same are avoided incident to the conjoint functioning of the agitating paddles and the liquid deflecting baffles The vertical agitating blades because of their forward cutting edges and rearwardly and laterally slanting liquid-impelling faces function incident to their forward movement to smoothly cut the water and to gently impel the liquid engaged by the faces thereof in lateral horizontal paths or directions. The thus horizontally and laterally impelled sections of the liquid body engaged thereby have impingement against the deflecting baffles. The rear cutting edges of said deflecting baffles effect a gentle cutting and subdividing of the liquid sections horizontally moved against the baffles with the further consequential result that the laterally and forwardly sloping rear faces on the vertically extending baffles impart further horizontally deflected movement to the liquid which was positively directed against the same. The result of the impelled and deflected movements in diverse horizontal directions is the realization of numerous successive agitative movements in innumerable relatively-horizontal directions. In such cases there is realized an effective floc development that is efficiently and progressively carried out because of the liquid undergoing treatment being detained and subjected to such agitative treatment in each horizontal section. The liquid thus treated has progressive movement from one horizontal section to the next. In other words, the liquid undergoing flocculation treatment has progressive general forward movement incident to the feed of liquid for treatment into one horizontal section and the delivery of flocculated liquid from a relatively remote or vertically spaced horizontal section. A function of the impelled lateral horizontal movements and of the deflected horizontal movements is therefore the avoidance of vertical short-circuiting of untreated liquid or of only partially treated liquid from liquid receiving section to the liquid discharge section of the flocculation space before proper flocculation treatment has been accorded thereto.

We claim:

1. Combined flocculation and sedimentation apparatus comprising a continuously operatable settler tank divided concentrically into a flocculation section and a sedimentation section, of which the flocculation section has less depth than that of the sedimentation section, flocculating paddles in the flocculation section, means for moving said paddles, means for submergedly passing flocculated liquid from the flocculation section to the deeper sedimentation section, sediment-raking blade-carrying arms, clarified effluent outlet means for said sedimentation section for determining the operative liquid level therein, a sediment discharge, and feed inlet means characterized by a centrally located vertically-disposed rotatably mounted tubular carrier having a discharge section forming a rising terminal of said inlet means and having said bladed arms secured thereto for concurrently rotating said bladed arms in the sedimentation section and releasing new feed into the flocculation section, and means for rotating said carrier.

2. Combined flocculation and sedimentation apparatus comprising a tank having an overflow for clarified supernatant that establishes the liquid level of the tank, a sediment discharge, rotatable sediment-impelling mechanism including slowly moving sediment contacting blades for conveying sediment to said discharge, partitioning means vertically-spaced above the tank bottom disposed horizontally-concentric with the tank and defining the inner limits of a sedimentation section and the outer limits of a flocculation section, means for rotating said mechanism, a feed passage terminating in the flocculation section for continually releasing incoming feed liquid in substantially radially outward directions, flocculating bladed assemblies in said flocculation section having vertically-disposed blades angularly disposed to their paths of motion to deflect liquid inwardly toward said passages, means for supporting said blades, means for moving said blades, and means for submergedly passing flocculated material from the flocculation section to the sedimentation section.

3. Combined flocculation and sedimentation apparatus comprising a tank having an overflow for clarified supernatant that establishes the liquid level of the tank, a sediment discharge, rotatable slowly moving sediment-engaging blades for conveying sediment to said discharge, means for rotating said blades, partitioning means vertically-spaced above the lower portion of the tank bottom disposed horizontally-concentric with the tank and defining the inner limits of a sedimentation section and the outer limits of a flocculation section, a feed passage terminating in the flocculation section for continually relasing incoming feed liquid therein, movable flocculating bladed assemblies in said flocculation section having blades angularly inclined to their paths of motion to deflect liquid toward the region of release of feed from said passage, means for supporting said blades, means for moving said blades, stationary baffles past which said blades move, said baffles also inclined angularly to the paths of said blades and directed for further contributing to the conjoint deflection of liquid toward the released feed from said passage, and means for submergedly passing flocculated material from the flocculation section to the sedimentation section.

4. A unit of the class described comprising a tank divided by a partial partitioning means into horizontally-concentric inner flocculation zone and an outer sedimentation zone in constant hydraulic communication with each other, a feed inlet passage to the inner zone, effluent withdrawal means which determines the normal operative level of the liquid within the tank, a sediment discharge, motivated flocculating means having paddles disposed for operation in the inner zone at rates of speed conducive to floc coagmentation and amassment, means for supporting said paddles, means for moving said paddles; and motivated sediment-raking means operable in the outer zone for transferring settled material to said sediment discharge, means for rotating said sediment raking means, said partial partitioning means being characterized by an outwardly-disposed bottom section having a central discharge opening, and a central plate disposed at an elevation higher than that of said opening whereby a baffled pasasgeway is constantly provided between the outwardly-disposed bottom section and the plate.

5. A unit as defined in and by claim 4, acocrding to which the outwardly-disposed bottom section slopes downwardly and inwardly and the central plate is flat and has sufficient radial extent whereby the marginal edge thereof extends proximate the opening defining edge of the floor section so that an endless non-obstructed passageway is thereby provided between the two zones.

6. A unit as defined in and by claim 4, according to which the outwardly-disposed bottom section having a central discharge opening and the central plate disposed at an elevation higher than that of said opening are mounted so that one of them has horizontal turnable movement relative to the other and whereby an endless non-obstructed passageway is constantly provided between them extending from the flocculation zone to the sedimentation zone.

7. A unit of the class described comprising a tank divided by a partial partitioning means into horizontally-concentric inner and outer zones that are in constant hydraulic communication through a submerged passageway provided by said partial partitioning means and into the inner of which there is received liquid containing flocculatable matter therein, effluent withdrawal means for said tank by which supernatant liquid is passed and which determines a normal operative level of the liquid within the tank, and a sediment discharge; said inner zone having less depth than the outer one, and serving as a flocculation section, flocculating paddles vertically-disposed for operation therein, means for moving said paddle; said outer zone serving as a quiescent sedimentation section, and sediment raking bladed arms therein; characterized by at least two supporting bearings above the normal level of the liquid within the tank, a turnable bearing member for said raking arms mounted on one of said supporting bearings, a vertically-extending carrier connecting said supporting bearing with said raking arms, thereby completing a raking assemblage, a second turnable bearing member for said paddles mounted on another supporting bearing, a paddle support connected to said second turnable bearing member and from which the bladed elements extend, thereby completing a flocculating assemblage, said turnable bearing members and the parts connected to each being turnable as separate unitary assemblies in horizontal closed paths about a common vertically-extending axis.

GEORGE M. DARBY.
WILLIAM C. WEBER.
ANTHONY J. FISCHER.